United States Patent
Smith

(10) Patent No.: US 6,280,037 B1
(45) Date of Patent: Aug. 28, 2001

(54) ALIGNING IMAGES OF A PROJECTION SYSTEM

(75) Inventor: Ronald D. Smith, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/258,052

(22) Filed: Feb. 26, 1999

(51) Int. Cl.[7] .................................... G03B 21/00
(52) U.S. Cl. ................................ 353/31; 353/122
(58) Field of Search .................... 353/31, 119, 122; 348/745, 747, 806, 807

(56) References Cited

U.S. PATENT DOCUMENTS

| | | | | |
|---|---|---|---|---|
| 5,092,671 | * | 3/1992 | Van Os | 353/119 |
| 5,200,815 | * | 4/1993 | Tsujihara et al. | 358/60 |
| 5,283,599 | * | 2/1994 | Tejima et al. | 353/30 |
| 5,475,447 | * | 12/1995 | Funado | 348/745 |
| 5,483,299 | * | 1/1996 | Minoura | 348/745 |
| 5,624,174 | * | 4/1997 | Loucks | 353/122 |
| 5,653,522 | * | 8/1997 | Loucks | 353/122 |
| 5,868,485 | * | 2/1999 | Fujimori et al. | 353/119 |
| 5,978,054 | * | 11/1999 | Fujimori | 349/60 |
| 6,056,407 | * | 5/2000 | Iinuma et al. | 353/119 |

FOREIGN PATENT DOCUMENTS

| | | |
|---|---|---|
| 0 734 184 A | 9/1996 | (EP) . |
| 05 273513 | 10/1993 | (JP) . |
| 05 281512 | 10/1993 | (JP) . |

OTHER PUBLICATIONS

Patent Abstract of Japan, vol. 018, No. 067 (Feb. 3, 1994).
Patent Abstracts of Japan, vol. 018, No. 048 (Jan. 25, 1994).

* cited by examiner

Primary Examiner—William Dowling
(74) Attorney, Agent, or Firm—Trop, Pruner & Hu, P.C.

(57) ABSTRACT

A projection system includes display panels, optics and an adjustment device. Each display panel is adapted to modulate a different beam of light to form an associated modulated beam of light. The optics are adapted to form an associated image of each modulated beam of light, and the adjustment device is adapted to position one of the display panels to adjust convergence of the images.

26 Claims, 8 Drawing Sheets

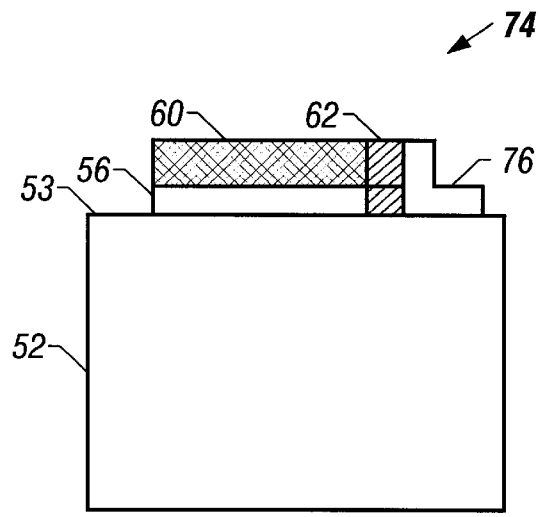
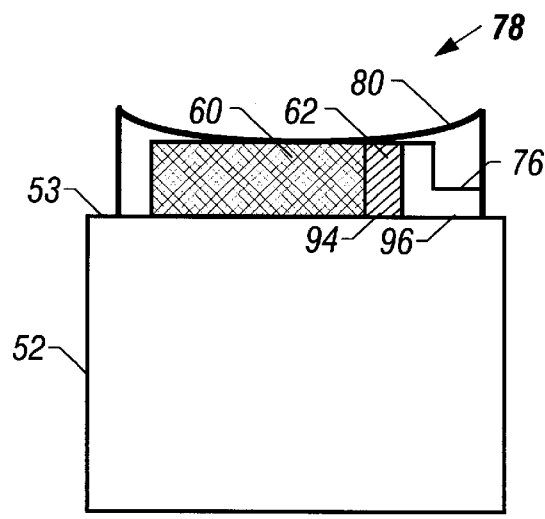
FIG. 9      FIG. 10
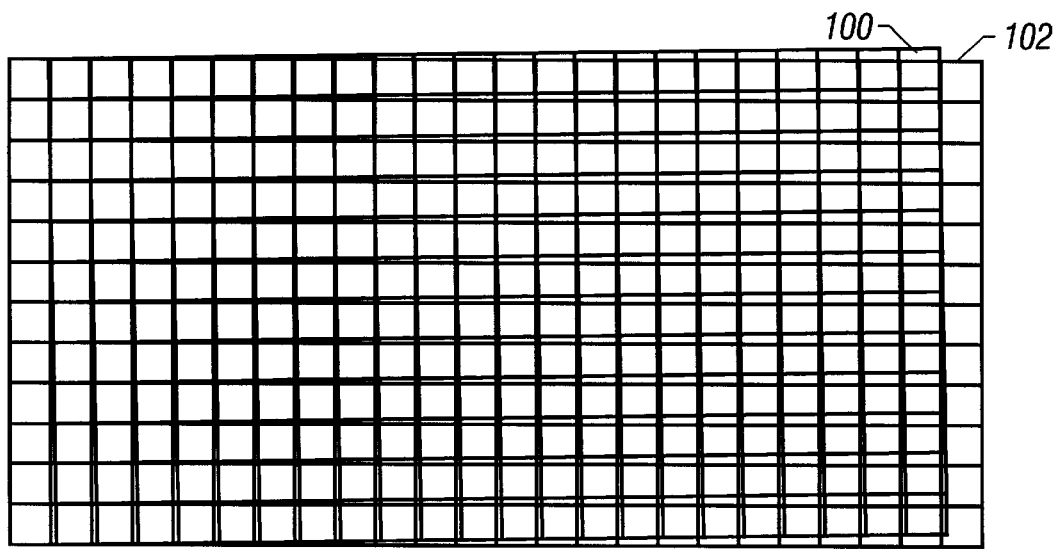
FIG. 11

ALIGNING IMAGES OF A PROJECTION SYSTEM

BACKGROUND

The invention relates to aligning images of a projection system, such as a liquid crystal display (LCD) projection system, for example.

Referring to FIG. 1, a reflective liquid crystal display (LCD) projection system 5 typically includes an LCD display panel (LCD display panels 22, 24 and 26, as examples) for each primary color that is projected onto a screen 10. In this manner, for a red-green-blue (RGB) color space, the projection system 5 may include an LCD display panel 22 that is associated with the red color band, an LCD display panel 24 that is associated with the green color band and an LCD display panel 26 that is associated with the blue color band. Each of the LCD panels 22, 24 and 26 modulates light from a light source 30 to form red, green and blue images, respectively, that add together to form a composite color image on the screen 10. To accomplish this, each LCD display panel 22, 24 or 26 receives electrical signals that indicate the corresponding modulated beam image to be formed.

More particularly, the projection system 5 may include a beam splitter 14 that directs a substantially collimated white beam 11 of light (provided by the light source 30) to optics that separate the white beam 11 into red 13, blue 17 and green 21 beams. In this manner, the white beam 11 may be directed to a red dichroic mirror 18 that reflects the red beam 13 toward the LCD panel 22 that, in turn, modulates the red beam 13. The blue beam 17 passes through the red dichroic mirror 18 to a blue dichroic mirror 20 that reflects the blue beam 17 toward the LCD display panel 26 for modulation. The green beam 21 passes through the red 18 and blue 20 dichroic mirrors for modulation by the LCD display panel 24.

For reflective LCD display panels, each LCD display panel 22, 26 and 24 modulates the incident beams, and reflects the modulated beams 15, 19 and 23, respectively, so that the modulated beams 15, 19 and 23 return along the paths described above to the beam splitter 14. The beam splitter 14, in turn, directs the modulated beams 15, 19 and 23 through projection optics, such as a lens 12, to form modulated beam images that ideally overlap and combine to form the composite image on the screen 10.

However, for purposes of forming a correct composite image on the screen 10, the corresponding pixels of the modulated beam images may need to align with each other. For example, a pixel of the composite image at location (0,0) may be formed from the superposition of a pixel at location (0,0) of the modulated red beam image, a pixel at location (0,0) of the modulated green beam image and a pixel at location (0,0) of the modulated blue beam image. Without this alignment, the color of the pixel at location (0,0) may be incorrect, or the color may vary across the pixel.

At the time of manufacture of the system 5, the LCD display panels 22, 24 and 26 typically are mounted with sufficient accuracy to align the pixels of the modulated beam images. One way to accomplish this is to approximate the correct position of the LCD display panels 22, 24 and 26 and thereafter use the LCD display panels 22, 24 and 26 to attempt to form a white rectangular composite image onto the screen 10. If the LCD panels 22, 24 and 26 are not properly aligned, then red 42, green 44 and/or blue 46 color borders may be detected around the perimeter of a white image 40 that is formed on the screen 10, as depicted in FIG. 2. However, when the LCD panels 22, 24 and 26 are properly aligned, the color borders 42, 44 and 46 do not appear, and an enlarged white image 40 appears on the screen 10, as depicted in FIG. 3.

Unfortunately, conventional techniques that are used to align the LCD display panels 22, 24 and 26 may consume a considerable amount of time in the manufacture of the projection system 5. Furthermore, such factors as aging and thermal drift may cause the LCD displays panels 22, 24 and 26 to fall out of alignment during the lifetime of the projection system 5.

Thus, there is a continuing need to address one or more of the problems stated above.

SUMMARY

In one embodiment, a projection system includes display panels, optics and an adjustment device. Each display panel is adapted to modulate a different beam of light to form an associated modulated beam of light. The optics are adapted to form an associated image of each modulated beam of light, and the adjustment device is adapted to position one of the display panels to adjust convergence of the images.

In another embodiment, a method includes modulating beams of light with display panels to form modulated beams of light. The modulated beams of light are optically directed to form images. The modulation is regulated to at least partially reduce portion of the images that do not overlap.

BRIEF DESCRIPTION OF THE DRAWING

FIGS. 5, 6 and 11 are illustrations of alignment scenarios between two modulated beam images that are formed by display panels of the projection system of FIG. 4.

FIGS. 8, 9, 10, 12 and 13 are schematic diagrams of arrangements to align and mount a display panel according to different embodiments of the invention.

DETAILED DESCRIPTION

Figure 1:
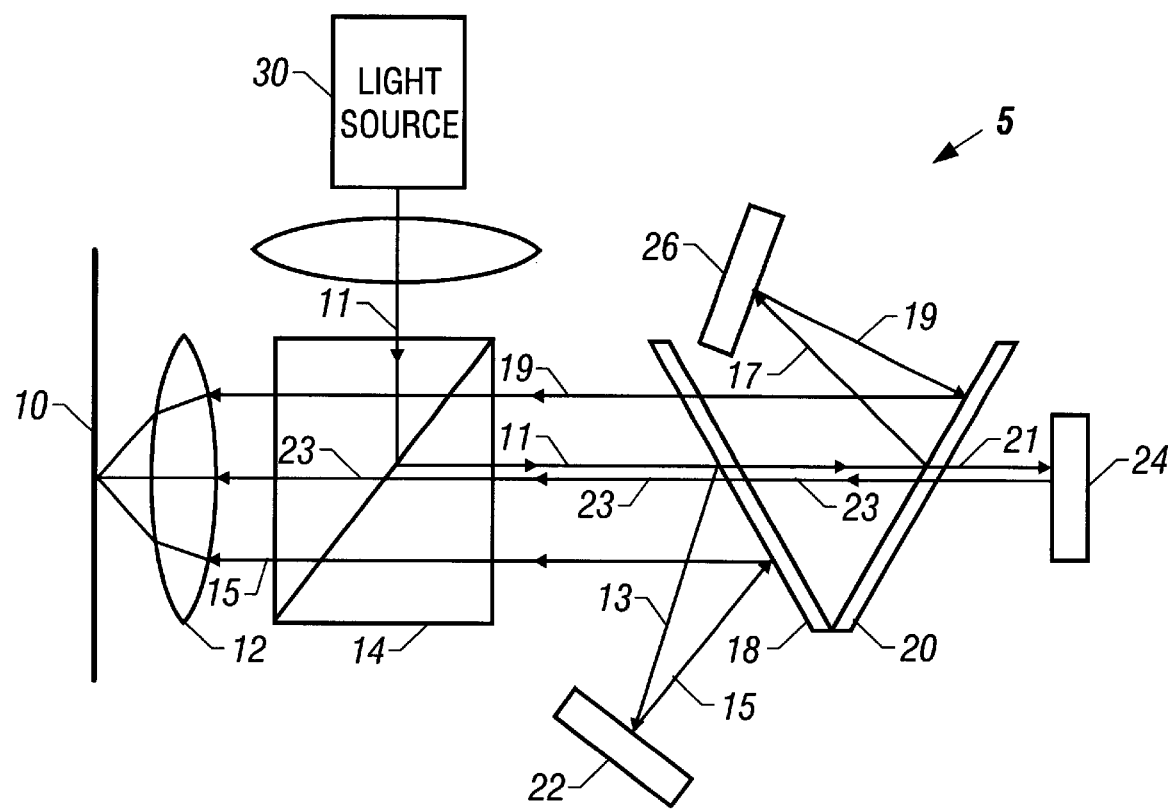
FIG. 1 is a schematic diagram of an LCD projection system of the prior art.
Figure 2:
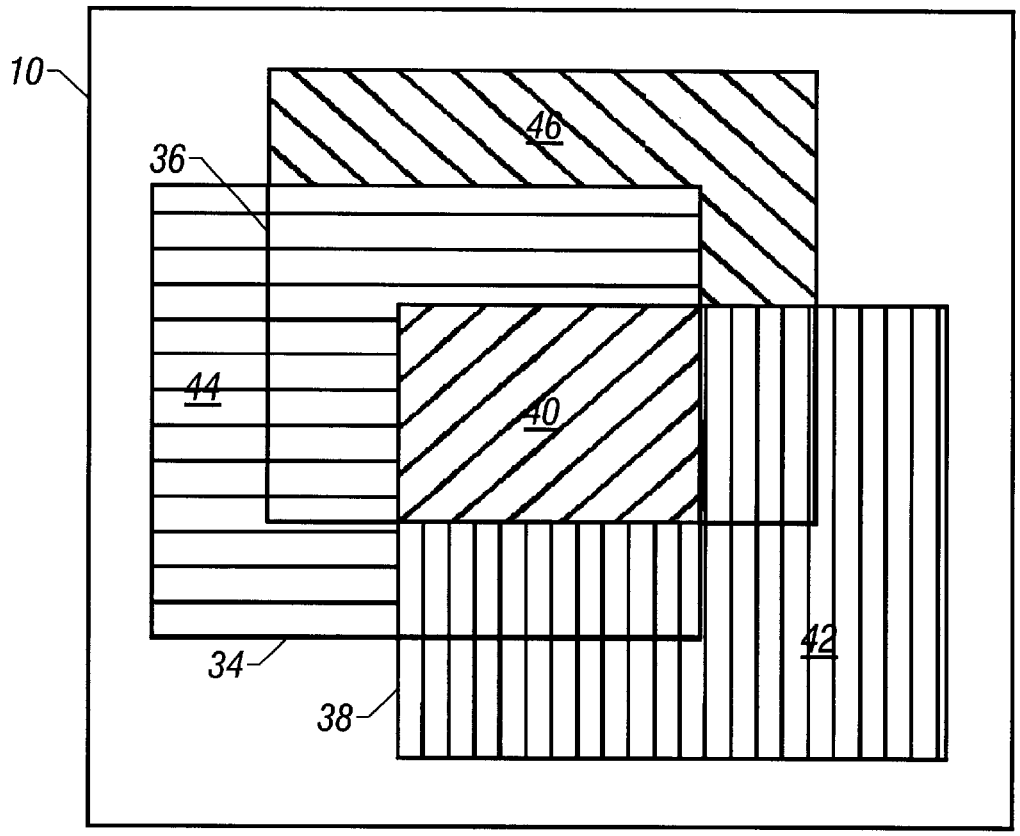
FIG. 2 is an illustration of images formed by LCD display panels of the system of FIG. 1 when the display panels are not aligned.
Figure 3:
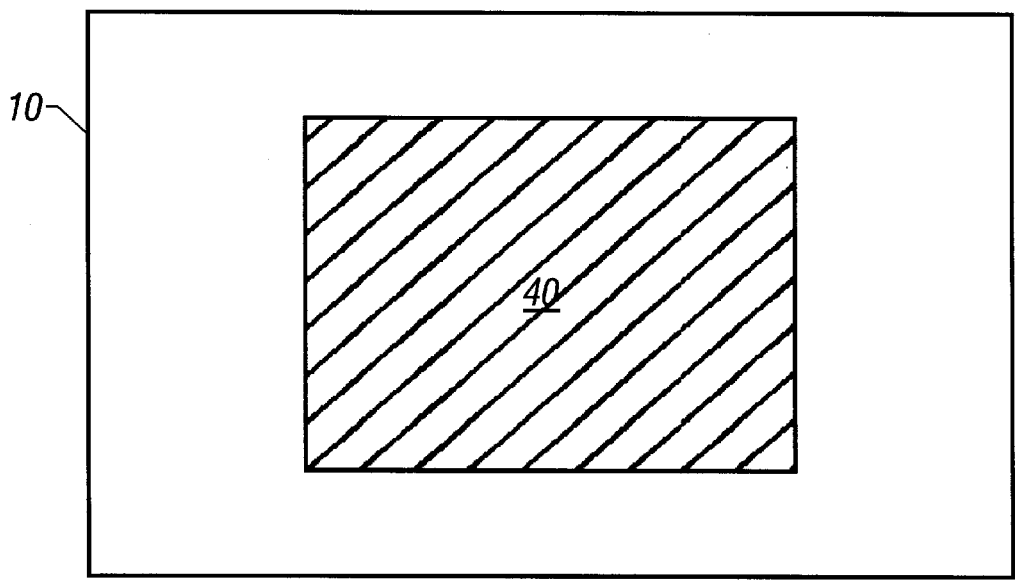
FIG. 3 is an illustration of an image formed by LCD display panels of the system of FIG. 1 when the display panels are aligned.
Figure 4:
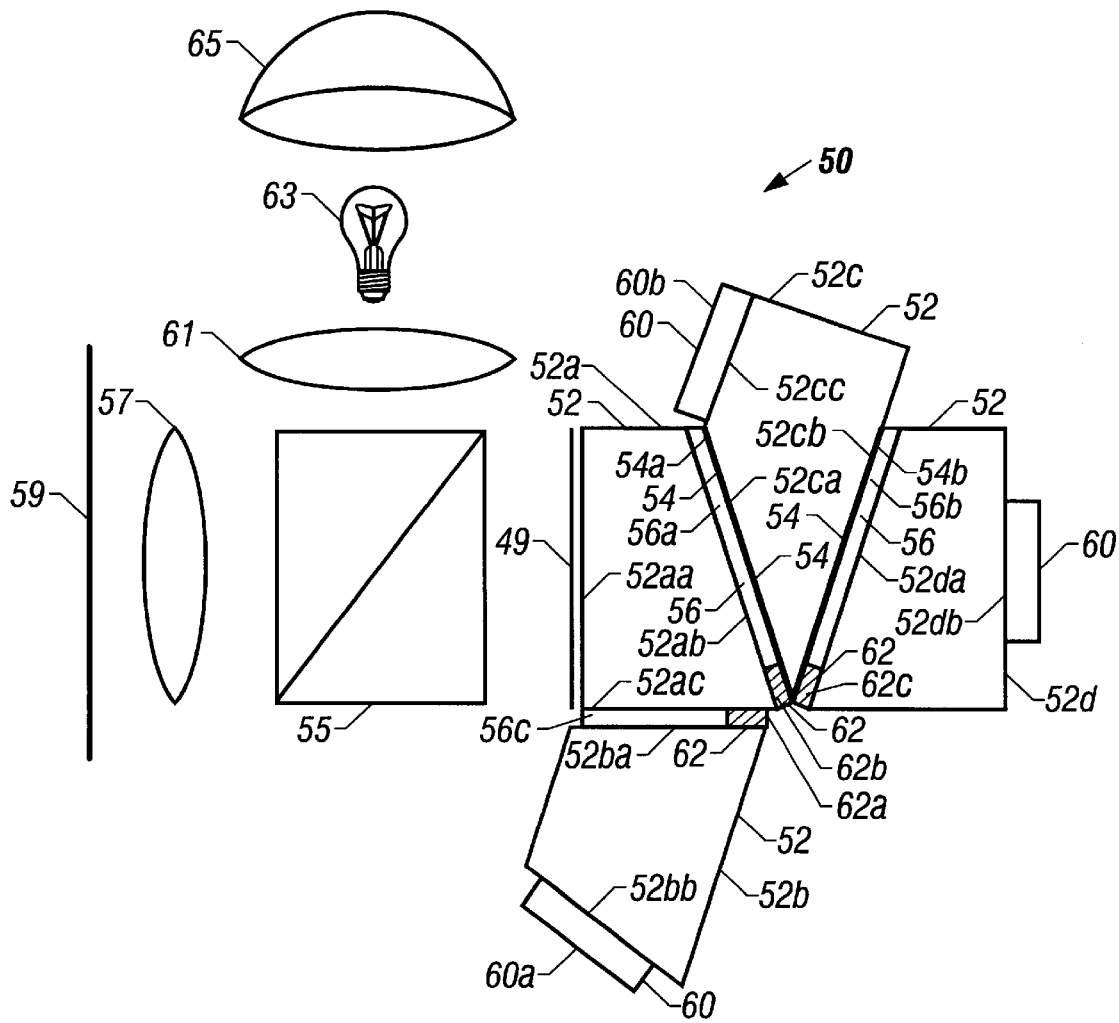
FIG. 4 is a schematic diagram of a projection system according to an embodiment of the invention.

Referring to FIG. 4, an embodiment 50 of a projection system in accordance with the invention includes actuators 62 that may be used to calibrate the positions of display panels 60 (display panels 60a, 60b and 60c, as examples) to adjust the convergence of modulated beam images that are formed by the display panels 60. To accomplish this, in some embodiments, the actuators 62 may be piezoelectric actuators, and electrical voltages may be selectively applied to the actuators 62 to selectively expand or contract the actuators 62 to position the display panels 60, as described below. As an example, in some embodiments, the projection system 60 may be a reflective liquid crystal display (LCD) projection system, and the display panels 60 may be LCD display panels.

Figure 5:
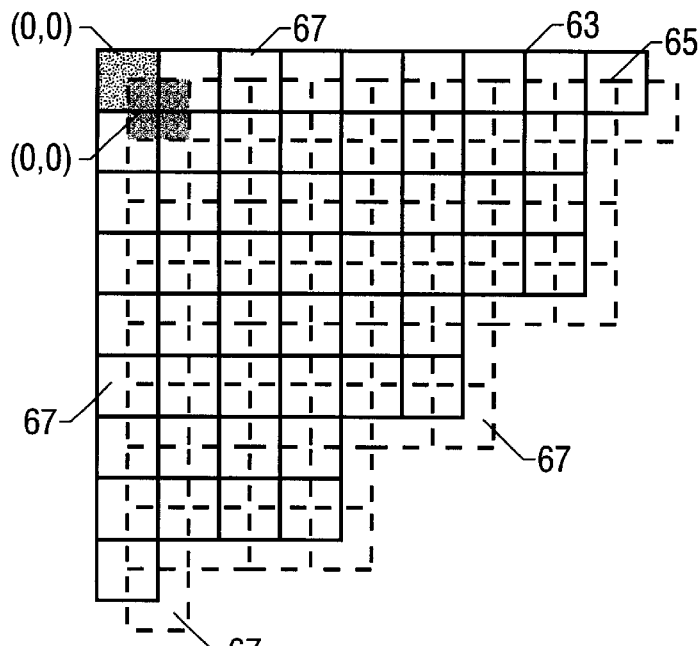

More particularly, FIG. 5 illustrates two modulated beam images 63 and 65, each of which is formed by a different display panel 60 modulating an incident beam of light of a particular color band. Each pixel 67 of the beam image 63 is located approximately ½ pixel from the corresponding pixel 67 of the beam image 65, i.e., the beam images 63 and 65 are "½ pixel" out of alignment. Thus, the pixel 67 at location (0,0) of the image 65 is approximately ½ pixel away from the pixel 67 at location (0,0) of the image 63. To cause the two beam images 63 and 65 to converge, the actuators 62 (see FIG. 5) may be used to reposition the display panel 60 that generated the beam image 63, reposition the display panel 60 that generated the beam image 65 or reposition both of the display panels 60. As illustrated, the rows (and columns) of pixels 67 of the beam image 63 are parallel to the rows (and columns) of pixels of the beam image 65. Thus, translational movement (and not rotational movement, described below) of one or more display panel(s) 60 may be used to cause the beam images 63 and 65 to converge.

Figure 6:
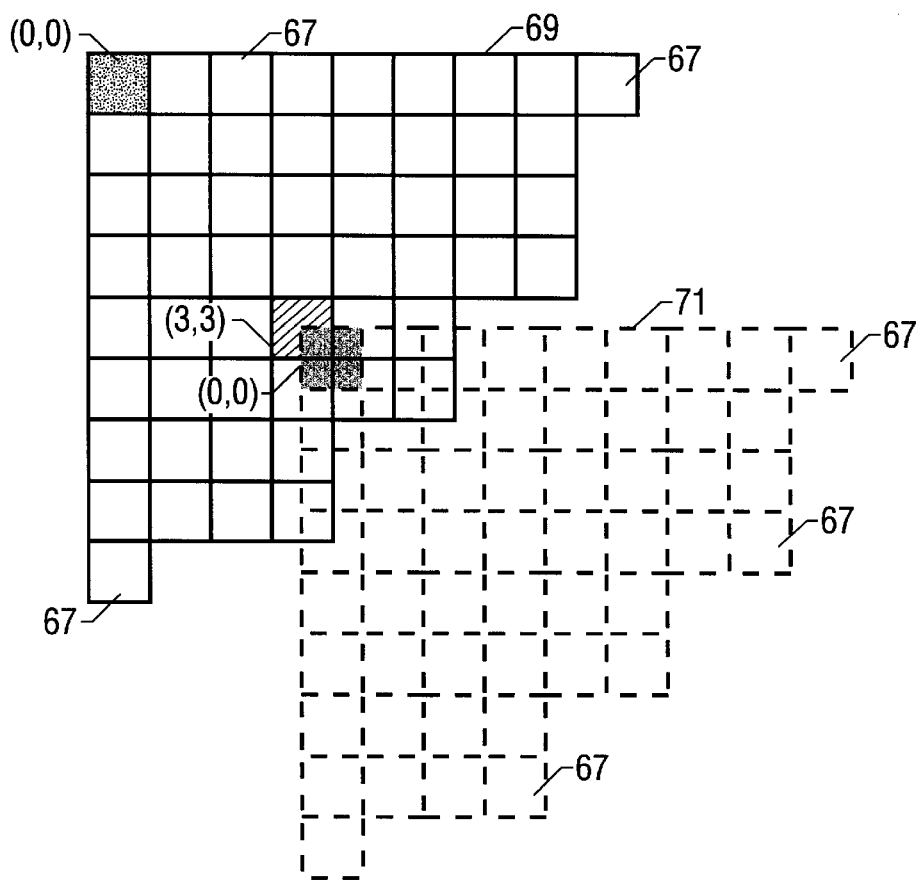

In some embodiments, the actuators 62 may be used to perform a maximum alignment of up to approximately one pixel, hereinafter called a fine, or local, adjustment, for purposes repositioning display panel(s) to align the boundaries of pixels. However, before calibration, some modulated beam images may be located further apart, as illustrated in FIG. 6. For example, a pixel 67 at location (0,0) of a modulated beam image 71 may be located several pixels away from a pixel at location (0,0) of a modified beam image 69. For this scenario, in some embodiments, the actuators 62 may be used to locally align the beam images 69 and 71 so that the pixels (regardless of their locations) of the beam images 69 and 71 are locally (but not globally) aligned. For example, due to this local alignment, the pixel at location (3,3) of the beam image 69 may be aligned with the pixel at location (0,0) of the beam image 71, i.e., the boundaries of the pixels are aligned.

Figure 7:
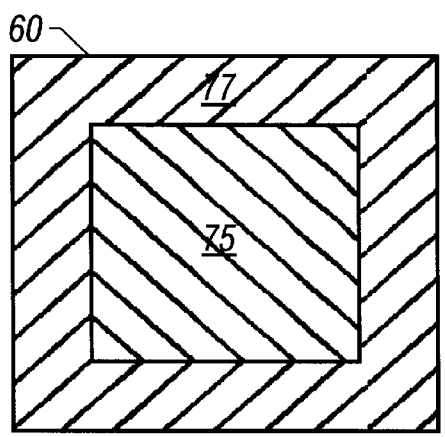
FIG. 7 is an illustration of a display panel according to an embodiment of the invention.

Referring also to FIG. 7, in some embodiments, coarse, or global, alignment may be performing by remapping pixels of one or more display panels 60, as described below. This remapping, in turn, may align the pixel at location (0,0) of the beam image 71 by remapping pixel locations of the display panel that forms the beam image 69, for example. For this to occur, extra pixels (also called "pixel cells" or "pixel elements") of the display 60 that forms the beam image 69 may be used. As an example, for a desired resolution of 1024 horizontal pixels by 768 vertical pixels (i.e., for a 1024×768 display), the display panel 60 may have 1034 horizontal pixels by 778 vertical pixels, i.e., ten extra pixels in both the vertical and horizontal directions. In this manner, a block 75 of the pixels may be active and thus, may be used to form the modulated beam image. The remaining pixels 77 may be inactive, or permanently turned off, due to the application of a mapping function to correct global misalignment. To accomplish this, the mapping of the pixels on the display panel 60 are adjusted accordingly to shift the block 75 of active pixels horizontally, vertically or in both directions.

Thus, in FIG. 6, the pixels of the display 60 that generated the beam image 69 may be remapped so that the pixels of the display that form pixels 67 of the beam image 69 that do not globally converge with the beam image 71 are turned off. Therefore, the pixels of the display panel 60 that form the beam image 69 may be remapped to effectively shift the block of active pixels of the display panel 60 down by four rows and to the right by three columns to globally align the beam images 69 and 71.

Referring back to FIG. 4, in some embodiments, the projection system 50 may include prisms 52 (prisms 52a, 52b, 52c and 52d, as examples) that direct an incoming beam of white light (formed from red, green and blue beams) from a light source 63 to the display panels 60, as described below. In particular, the prism 52a receives the incoming white beam of light at a prism face 52aa that is normal to the incoming light and directs the beam to a prism face 52ab that is inclined toward the face 52aa. The reflective face of a red dichroic mirror 54a may be mounted to the prism face 52ab or to the prism face 52ca by a transparent elastomeric adhesive layer 56a that aids in positioning the display panels 60b and 60c, as further described below.

The red dichroic mirror 54a separates the red beam from the incoming white beam by reflecting the red beam so that the red beam exits another prism face 52ac of the prism 52a and enters a prism face 52ba of the prism 52b. The prism faces 52ac and 52ba may be mounted together via a transparent elastomeric adhesive layer 56c that aids in positioning the display panel 60a, as further described below. The prism 52b, in turn, directs the red beam to the incident face of the display panel 60a that is mounted to another prism face 52bb of the prism 52b that is inclined toward the prism face 52ba. The display panel 60a modulates the incident red beam, and the modulated red beam follows a similar path to the path followed by the incident red beam. However, instead of being directed toward the light source 63, a beam splitter 55 directs the modulated red beam through projection optics 57 (a lens, for example) that forms an image of the modulated red beam on a screen 59.

The remaining blue and green beams (from the original incoming white beam) pass through the red dichroic mirror 54a. The opposite face of the mirror 54a is attached to a prism face 52ca of the prism 52c, an arrangement that causes the blue and green beams to pass through the red dichroic mirror 54a, pass through the prism face 52ca of the prism 52c, travel through the prism 52c and pass through a prism face 52cb (of the prism 52c) that forms an acute angle with the prism face 52ca. The reflective face of a blue dichroic mirror 54b is mounted to the prism face 52cb or to the prism face 52da. As a result, the blue dichroic mirror 54b reflects the blue beam back into the prism 52c to cause the blue beam to exit another prism face 52cc of the prism 52c. The incident face of the display panel 60b is mounted to the face 52cc and modulates the incident blue beam. The modulated blue beam, in turn, follows a path similar to the path followed by the incident blue beam. The beam splitter 55 directs the modulated blue beam through the projection optics 57 to form an image of the modulated blue beam on the screen 59.

The green beam passes through the blue dichroic mirror 54b and enters the prism 52d through a prism face 52da that may be mounted to the other face of the blue dichroic mirror 54b via a transparent elastomeric adhesive layer 56b. The resiliency provided by the adhesive layer 56b, in turn, aids in positioning the display panel 60c, as further described below. The green incident beam exits another prism face 52db of the prism 52d to strike the incident face of the display panel 60c that is mounted to the prism face 52db. The display panel 60c modulates the incident green beam before reflecting the modulated green beam along a path similar to the path followed by the incident green beam. The beam splitter 55 directs the modulated green beam through the projection optics 57 to form an image of the modulated green beam on the screen 59. The three modulated beam images form a color composite image on the screen 59.

For purposes of adjusting the position of one or more of the display panels 60, as further described below, the prisms 52b, 52c and 52d may be moved by the actuators 62 to reposition the display panels 60 that are attached to the prisms 52. In some embodiments, for this to occur, the prism 52a may be securely mounted to a chassis (not shown) of the projection system 50, and the other prisms 52b, 52c and 52d may move with respect to the prism 52a, as further described below. More particularly, the actuator 62a may be mounted between and contact the prism faces 52ac and 52ba. In some embodiments, the actuator 62a may also be mounted near the edges of the prism faces 52cc and 52ba. Because the prism 52a may be secured to the chassis of the projection system 50 and because the adhesive layer 56a provides a resilient bond between the prisms 52a and 52b, the expansion or contraction of the actuator 62a causes the display panel 60a to rotate in the plane of the diagram. This rotation, in turn, causes the image to translate. In some embodiments, these motions, in turn, may be controlled to locally adjust the modulated red beam image on the screen 59 by adjusting the voltage that is applied to the piezoelectric actuator 62a, for example.

Other actuators 62 may be used to cause both translation and rotation of the other display panels 60 in a similar manner. For example, the actuator 62b may be positioned between and contact the prism faces 52ab and 52ca. In this manner, expansion and contraction of the actuator 62b causes rotation and therefore image translation of the display panel 60b and thus, may be used to move both the modulated blue and green beam images.

Movement of the prism 52c by the actuator 62b may also cause movement of the prism 52d and thus, movement of the display panel 60c. However, the position of the display panel 60c may be adjusted by the actuator 62c that may be positioned between and contact the prism faces 52cb and 52da. In this manner, expansion or contraction of the actuator 62c may be used to adjust the position of the display panel 60c and thus, align the modulated blue beam image with the modulated red and green beam images.

Other arrangements are possible. For example, in other embodiments, actuators 62 (not shown) may be used to cause, for example, rotation of a particular display panel 60 about a plane that is orthogonal to the plane of the diagram.

Figure 8:
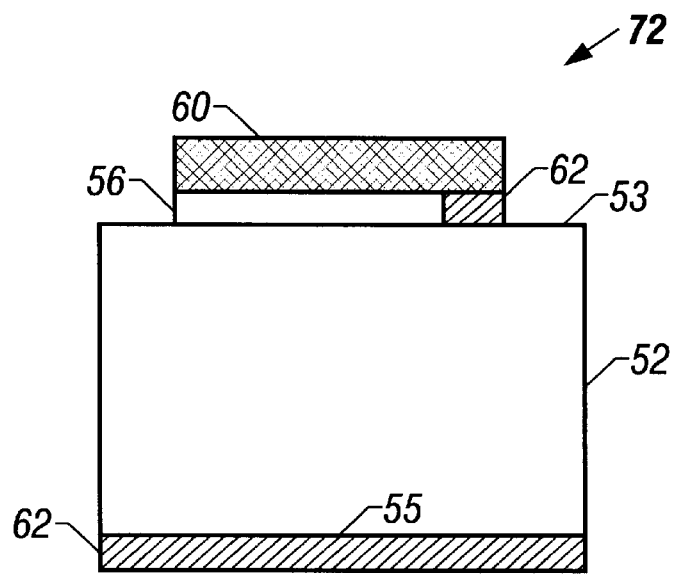

In other embodiments, the actuators 62 may be arranged differently. For example, referring to FIG. 8, in another arrangement 72 for each prism 52, the transparent elastomeric adhesive layer 56 may mount the associated display panel 60 to a prism face 53 of the prism 52. In this manner, the actuator 62 may be mounted between the display panel 60 and the prism face 53. At an opposite prism face 55 that receives the incident beam, the prism 52 may be rigidly secured to another actuator 62 that couples the prism 52 to one of the other prisms 52 or dichroic mirrors 54.

Among the other features of the projection system 50, the system 50 may include a parabolic mirror 65 to collimate rays of light from the light source 63. The light source 63 may be an arc lamp, for example. The projection system 50 may also include a condensing lens 61 to direct the white beam to the beam splitter 55. The beam splitter 55, in turn, may direct the white beam to a polarizer 49 that polarizes the white beam before the beam strikes the prism face 52aa.

The projection system 50 is one of many possible projection systems that may embody the invention, and the invention is not intended to be limited to the illustrated system 50. Rather, the invention is defined by the appended claims.

Referring to FIG. 9, in another arrangement 74 for each prism 52, a display panel 60 may be mounted to the prism face 53 of the prism 52 via an adhesive layer 56. An actuator 62 may be mounted between and contact the face of a right angle flange 76 and an edge of the display panel 60. The other face of the right angle flange 76 may be mounted to the prism face 53. In this manner if the actuator 62 substantially contacts the display panel along the panel's edge, contraction and expansion of the actuator 62 may act on the entire display panel 60 and thus, may move the display panel 60 along a straight path. As a result, the arrangement 74 may be used to produce translation and not rotation of the modulated beam image that is formed by the display panel 60. In some embodiments, the arrangement 74 may include another flange 76 (not shown) and another actuator 62 (not shown) that are arranged to translate the display panel 60 in a second orthogonal direction to allow two-dimensional translational movement of the display panel 60. However, in other embodiments, the actuator 62 may contact the display panel 60 at one corner. As a result, the resiliency of the elastomeric adhesive layer 56 may cause the display 60 to rotate and not translate. This effect may be useful for removing angular errors.

Referring to FIG. 10, in other embodiments, an arrangement 78 may be used that is similar to the arrangement 74 (and the variations thereto) described above except that a mounting spring 80, instead of the adhesive layer 56, may mount the display panel 60 to the prism face 53. More particularly, the display panel 60 may be frictionally mounted to the prism face 53 by the force of the spring 80 that exerts a downward force (on the display panel 60) that is directed toward the prism face 53. However, the spring 80 is sufficiently resilient to permit the display panel 60 to move in response to contraction or expansion of the actuator(s) 62.

The above-described solutions to alignment of the modulated beam images address both pixel translation and rotation. However, rotationally alignment of the modulated beam images may be accomplished in other ways as described below.

In general, the effects of rotational misalignment between two modulated beam images 100 and 102 may be very noticeable as depicted in FIG. 11. As shown, each of the beam images 100 and 102 may have dark lines in between adjacent pixel rows and pixel columns due to the nature of the display panel 60. Therefore, when the two beam images 100 and 102 are rotated relative to each other, certain parts of the composite image may be partially transparent because the dark lines nearly align with each other in these parts, and other parts of the composite image may be nearly opaque as the dark liner are close together in these parts. As illustrated in FIG. 11, although the beam images 100 and 102 are both translationally misaligned and rotationally misaligned by 1°, the rotational misalignment may be perceptually the most apparent.

There are several ways to rotationally align the modulated beam images. For example, the display panels 60 may be securely mounted to the faces of the prisms 52 during assembly of the projection system 50. During the mounting, indication of a test pattern may be used to modulate the display panels 60 so that the resultant modulated beam images may be observed to physically position the display panels 60 correctly to cause beam convergence.

Figure 12:
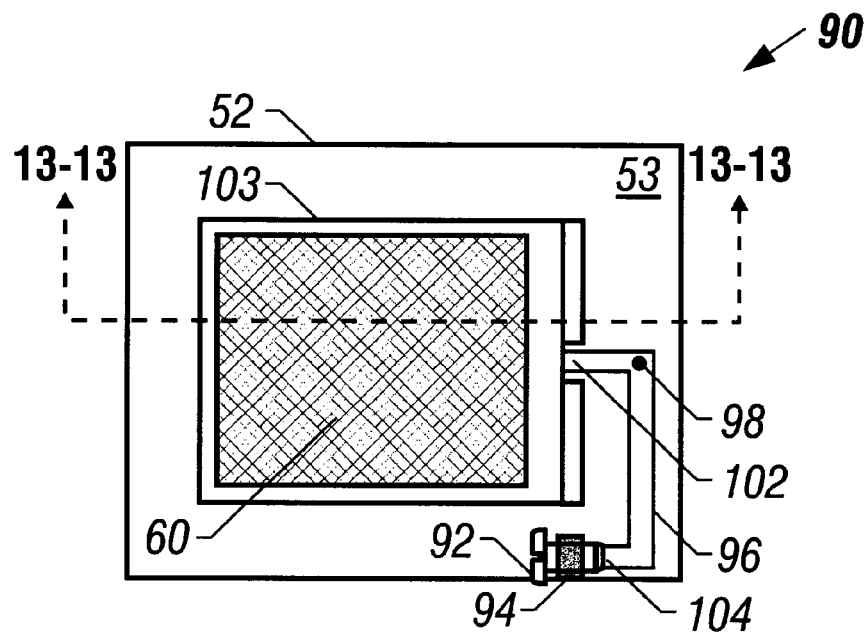
Figure 13:
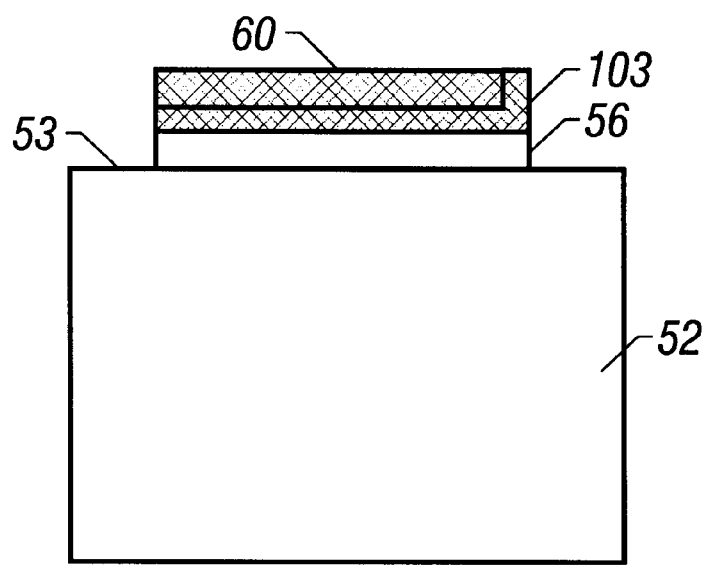

Alternatively, in some embodiments, an arrangement 90 that is depicted in FIG. 12 may be used to rotate each display panel 60. In particular, the display panel 60 may be securely mounted to an open frame 103 that, in turn, is mounted to a prism face 52 of a prism 52 via a transparent elastomer adhesive layer 56. A pawl 96 may be pivotably mounted (via a pivot 98) to the prism face 53 by a pawl pivot 98. One end 102 of the pawl 96 may be secured to the frame 100, and another end 104 of the pawl 96 may contact the end of an adjusting screw 92. The adjusting screw 92 extends through a threaded element 94 that is mounted to the prism face 53. In this manner, the screw 92 may be turned to rotate the pawl 96 to selectively rotate the display panel 60 (and the associated modulated beam image) to the desired position.

In other embodiments, the screw 92 may be replaced by an actuator, such as a piezoelectric actuator, for example. In these embodiments, the pivot 98 may be located close to the actuator 60 to maximize the range of motion for alignment purposes. In other embodiments, the screw 92 may be driven by a motor (a permanent magnet DC motor, for example) or be replaced by the shaft of a linear actuator, for example.

Figure 14:
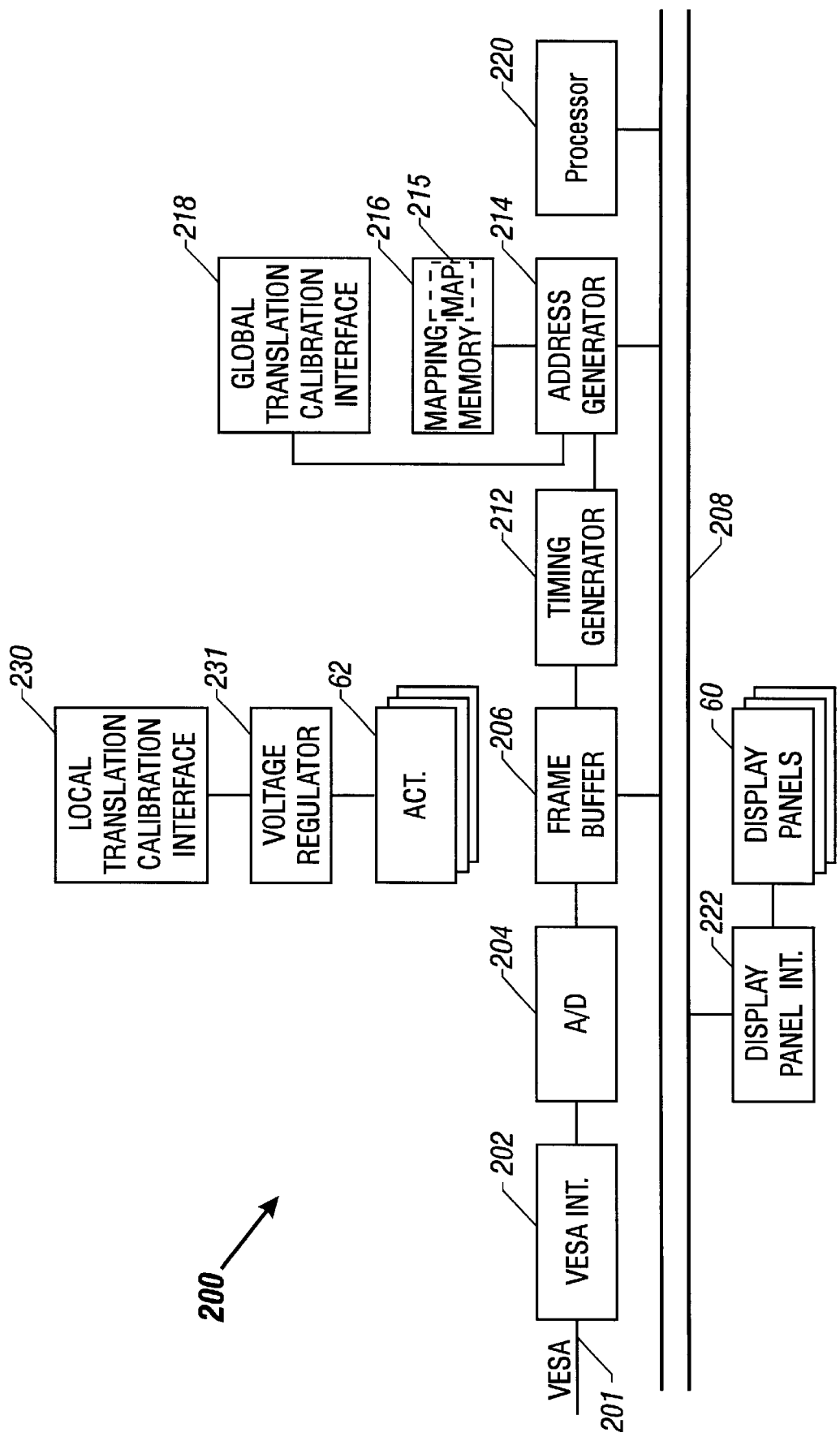
FIG. 14 is an electrical schematic diagram of the projection system of FIG. 4 according to an embodiment of the invention.

Referring to FIG. 14, the projection system 50 may include the following electrical system 200 that may be part of a computer system, part of a stand-alone projector, on part of a television, as just a few examples. In particular, the electrical system 200 may include a Video Electronics Standards Association (VESA) interface 202 to receive analog signals from a VESA cable 201. The VESA standard is further described in the Computer Display Timing Specification, v.1, rev. 0.8 that is available on the Internet at www.vesa.orgstandards.html. The analog signals from the cable 201 indicate images to be formed on the display 59 and may be generated by a graphics card of a computer, for example. The analog signals are converted into digital signals by an analog-to-digital (A/D) converter 204, and the digital signals are stored in a frame buffer 206. A timing generator 212 may be coupled to the frame buffer 206 and regulate a frame rate at which images are formed on the screen 59. A processor 220 (one or more microcontroller(s) or microprocessor(s), as examples) may be coupled to the frame buffer 206 via a bus 208.

The processor 220 may process the data stored in the frame buffer 206 to, as examples, transform the coordinate space used by the graphics card into the coordinate space used by the display panels 60, remap the color space used by the graphics card into the color space used by the display panels 60 and cause the data to conform to the gamma function of the display panels 60. The end product of these operations is a set of RGB values for each pixel of the image. In this manner, the R values are used to form the intensity values of the pixels of the red display panel 60a, the G values are used to form the intensity values of the pixels of the green display panel 60c and the B values are used to form the intensity values of the pixels of the blue display panel 60b.

Figure 15:
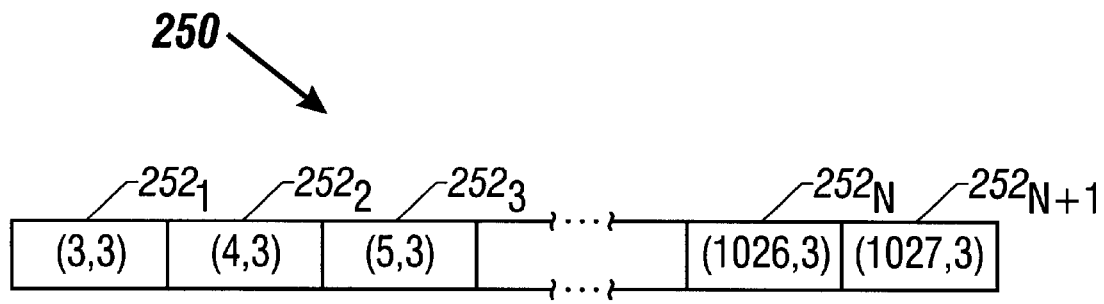
FIG. 15 is an illustration of a portion of a pixel map.

As described above, not all of the pixels of a particular display panel 60 may be used. Instead, a map 215 may be stored in a mapping memory 216 that indicates the desired mapping. The map 215, in turn, may be used by an address generator 214 that generates signals indicative of pixel addresses for pixels of the display panels 60. Referring to FIG. 15, as an example, for a particular display panel 60, N locations 252 (locations $252_1$, $252_2$, $252_3$, . . . $252_N$) of the map 215 may sequentially indicate the mapping for the uppermost row of a pixel image, beginning with the location (0,0) of the pixel image. As shown, location (0,0) of the pixel image maps into location (3,3) of the display panel 60, location (1,0) of the pixel image maps into location (4,3) of the display panel 60, location (1,1) of the pixel image maps into location (5,3) of the display panel 60, etc.

Referring back to FIG. 14, among the other features of the system 200, the system 200 may include a display panel interface 222 that is coupled to the bus 210 and drives the display panel voltages to form the images on the display panels 60. A global translation calibration interface 218 (an electromechanical user interface or a serial bus interface, as examples) may be electrically coupled to the address generator 214. In this manner, the calibration interface 218 may modify the map 215 in response to the global translation indicated by the controls (a computer or a control knob, as examples) that are coupled to the interface 218. A local translation interface 230 (an electromechanical user interface or a serial bus interface, as examples) may be, for example, coupled to a voltage regulator 231 to selectively control the voltages that are applied to the different piezoelectric actuators 62. Other arrangements are possible. For example the system 200 may include an electrical global rotation interface and associated circuitry that operates as described above.

Other embodiments are within the scope of the following claims. For example, different topologies for the prisms may be used. In this manner, for each of these different topologies, the prisms may have locations for mounting actuators. As another example, in some embodiments, transmissive display panels may be used.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A projection system comprising:

display panels, each display panel adapted to modulate a different beam of light to form an associated modulated beam of light;

optics adapted to form an associated image of each modulated beam of light;

an adjustment device adapted to position one of the display panels to adjust convergence of the images;

a prism adapted to propagate the modulated beam of light associated with said one of the displays; and a resilient element mounting the display panel to the prism, wherein the adjustment device is further adapted to selectively apply force to move said one of the display panels with respect to the prism to adjust the convergence.

2. The projection system of claim 1, wherein each image includes pixel lines, and the adjustment device is further adapted to move said one of the display panels to translationally align pixel lines of the associated image with pixel lines of another one of the images.

3. The projection system of claim 1, wherein each image includes pixel lines, and the adjustment device is further adapted to move said one of the display panels to rotationally align pixel lines of the associated image with pixel lines of another one of the images.

4. The projection system of claim 1, wherein the adjustment device comprises:

a pawl pivotably mounted to selectively position said one of the displays.

5. The projection system of claim 1, wherein the resilient element comprises:

an adhesive.

6. The projection of claim 1, wherein the resilient element comprises:
   a spring.
7. The projection system of claim 1, wherein the display panel comprises:
   an LCD display panel.
8. The projection system of claim 1, wherein
   each image includes pixel lines, and
   the adjustment device is further adapted to move said one of the display panels to rotationally align pixel lines of the associated image with pixel lines of another one of the images.
9. The projection system of claim 1, wherein the adjustment device comprises:
   a pawl pivotably mounted to selectively position said one of the displays.
10. The projection system of claim 1, wherein the display panel comprises:
    an LCD display panel.
11. A method comprising:
    modulating beams of light with display panels to form modulated beams of light;
    optically directing the modulated beams of light to at least partially converge to form an image; and
    regulating the modulation to at least partially reduce portions of the modulated beams of light that do not converge to form the image.
12. The method of claim 11, wherein
    at least one of the display panels comprises pixel cells, and
    the act of regulating the modulation comprises:
       selecting a first set of the pixel cells that produce at least part of the portions; and
       turning off the first set of pixel cells in response to the selection.
13. The method of claim 10, wherein the act of regulating the modulation further comprises:
    remapping signals for driving the first set of pixel cells so that the signals drive a second set of the pixel cells.
14. The method of claim 11, wherein the first set of pixel cells comprises:
    at least one row of pixels.
15. The method of claim 11, wherein the first set of pixel cells comprises:
    at least one column of pixels.
16. A computer system comprising:
    a processor adapted to generate signals indicate of a pixel image;
    display panels having pixel elements adapted to use the signals to modulate beams of light to form modulated beams of light;
    optics adapted to direct the modulated beams of light to at least partially converge to form an image; and
    an address generator adapted to selectively route the signals to the pixel elements to at least partially reduce portions of the modulated beams that do not converge to form the image.

17. The computer system of claim 16, further comprising:
    a control to adjust the derouting by the address generator.
18. The computer system of claim 16, further comprising
    a memory to store a map, and
    wherein the address generator is further adapted to use the map to selectively route the signals.
19. A projection display comprising:
    display panels having pixel elements adapted to receive signals to modulate beams of light to form modulated beams of light;
    optics adapted to direct the modulated beams of light to at least partially converge to form an image; and
    an address generator adapted to selectively route the signals to the pixel elements to at least partially reduce portions of the modulated beams that do not converge to form the image.
20. The projection system of claim 19, further comprising:
    a control to adjust the derouting by the address generator.
21. The projection system of claim 19, further comprising:
    a memory to store a map, and
    wherein the address generator is further adapted to use the map to selectively route the signals.
22. A projection system comprising:
    display panels, each display panel adapted to modulate a different beam of light to form an associated modulated beam of light;
    optics adapted to form an associated image of each modulated beam of light;
    an adjustment device adapted to position one of the display panels to adjust convergence of the images;
    a prism adapted to propagate the modulated beam of light associated with said one of the displays; and
    a resilient element mounting the display panel to the prism,
    wherein the adjustment device is further adapted to selectively apply force to flex the resilient element to move said one of the display panels with respect to the prism to adjust the convergence.
23. The projection system of claim 22, wherein the adjustment device comprises:
    a piezoelectric actuator adapted to respond to an electrical signal to adjust the position of said one of the displays.
24. The projection system of claim 22, wherein
    each image includes pixel lines, and
    the adjustment device is further adapted to move said one of the display panels to translationally align pixel lines of the associated image with pixel lines of another one of the images.
25. The projection system of claim 22, wherein the resilient element comprises:
    an adhesive.
26. The projection system of claim 22, wherein the resilient element comprises:
    a spring.

* * * * *